United States Patent Office 3,364,994
Patented Jan. 23, 1968

3,364,994
OIL WELL TREATING METHOD
Eugene L. Sterrett, 326 Elizabeth St.,
Findlay, Ohio 45840
No Drawing. Continuation-in-part of application Ser. No. 282,225, May 22, 1963. This application Feb. 25, 1966, Ser. No. 529,975
16 Claims. (Cl. 166—9)

The present application is a continuation-in-part of my copending application Ser. No. 282,225, filed May 22, 1963, and now abandoned.

This invention relates to an oil well treating method, and, more particularly, to such a method which includes the steps of forcing air, combustion products or the like downwardly into a producing well and back into the rock formation of an oil reservoir, as distinguished from an injection well, and injecting a surface active agent into the producing well with an intermediate portion of the air, combustion products or the like.

The invention has particular utility in connection with the treatment of wells which are depleted because they produce an excessive proportion of water relative to the desired crude oil. This situation may arise as a consequence of naturally occurring water, or as a consequence of water flood injection techniques. In the latter situation, a producing well, sometimes known as a withdrawal well, is surrounded by a plurality of injection wells into which water is injected in an attempt to force a flow of crude oil to the withdrawal well. Such a technique is effective for a period of time, but a situation ultimately develops where the proportion of water delivered by the producing well is so high that further working is economically unsound. A similar situation arises in many instances where water flood injection techniques are not employed, but the water that is pumped occurs naturally.

In retrospect, in the light of the instant invention, it is believed that depletion of a well as a consequence of the phenomenon discussed above occurs because of preferential flow of water, which has substantially lower viscosity than that of most crude oils, and channeling thereof through the paths of least resistance to the vicinity of the producing well. Once channels are established through which the water can flow preferentially there is little force tending to cause the flow of oil to the producing well and, in essence, the water flooding technique becomes useless, or there is no known way to prevent the preferential flow of naturally occurring water to the producing well.

The instant invention is based upon the discovery of a method for treating oil wells which have reached, or are approaching, depletion because an excessively high proportion of water is being withdrawn from the producing well. Treatment of such a well in accordance with the invention causes a substantial increase in the proportion of oil to water in the effluent from the producing well.

It is, therefore, an object of the invention to provide a method for treating oil wells.

It is a further object of the invention to provide such a method which is particularly effective for treating wells which have reached, or are approaching, depletion because an excessively high proportion of water is produced.

Other objects and advantages will be apparent from the description which follows, which is intended only to illustrate and disclose, and in no way to limit, the invention.

According to the invention, a method for treating oil wells is provided. Such method comprises forcing a substantial volume of air, combustion products or the like downwardly through a producing or withdrawal well. It is usually preferred to continue pumping the well during the forcing of air or the like downwardly thereinto, so that substantially all liquid can be withdrawn from the vicinity of the bottom of the well casing; this, however, is not essential, since substantial advantage can be achieved by the treating method even when some liquid remains in the vicinity of the lower extremity of the casing. The forcing of air, combustion products or the like downwardly into the well forces liquid, principally water, in the underground formation backwardly in all directions away from the well, and preferentially through the channels or fingers which had previously formed, and were responsible for the depletion, or pending depletion. After a substantial proportion of the air, combustion products or the like which are to be used relative to a particular treatment have been forced downwardly through the well, a surface active agent is suspended, for example as an aerosol, in the air, combustion products or the like, and forced therewith into the well. Because, at this stage of the well treatment, the channels or fingers through which preferential water flow had caused the well to be depleted, or to approach depletion, are substantially free of water at the time the surface active agent is forced thereinto, the situation is peculiarly advantageous for the agent to treat the stone, sand or the like formations through which the passages had been formed. Because the stone, sand or the like is wet from the recent flow of water through the passages, the hydrophilic portion of the surface active agent adheres to the stone, sand or the like, and the hydrophobic portion thereof is exposed to make the formations lipophilic. When the surface active agent injection has been completed, further flow of air, combustion products or the like downwardly through the producing well is continued to assure that the agent is carried well into the passages or fingers through which preferential flow of water had previously occurred.

As has been indicated above, the method of the invention comprises forcing a substantial volume of air, combustion products or the like downwardly through a producing or withdrawal well. The actual volume of air or the like injected depends upon the reservoir characteristics, and usually ranges from about 50,000 to about 900,000 standard cubic feet. The use of at least about 50,000 standard cubic feet is necessary in most instances to assure satisfactory treatment, but the use of more than 900,000 standard cubic feet is not detrimental relative to the efficacy of the treatment, but only economically unsound. Any gas can be used in place of air or combustion products, but for economic reasons, hydrocarbon gases, nitrogen, carbon dioxide, mixtures of any two or more of these, or of any one or more of these with air or natural gas are usually preferred. When air is used as the treating gas, it is usually desirable to add thereto a suitable agent to prevent oxygen corrosion of the metal components of the well. Numerous examples of such agents are well known. Such expedient is not required when an inert or non-corrosive gas is employed, but the non-corrosive gas or gas mixture may be somewhat more expensive than air. Accordingly, the preferred gas or gas mixture for use in accordance with the invention depends upon economic considerations, and may vary, depending upon availability of equipment in particular regions. Combustion products can be used advantageously in many instances, as they are relatively non-corrosive, and can be generated economically in large volumes and at suitable pressures.

The time, relative to the gas injection cycle, when the surface active agent is injected in treating a well in accordance with the invention should be sufficiently late that the passages or fingers in the reservoir formation are substantially free of liquids. Under most circumstances, it is preferred that from about 15 percent to about 25 percent of the total volume of gas to be injected should be introduced into the well prior to the injection of the surface active agent, and that from about 10 percent to about 15 percent of the total volume of gas be injected after completion of the surface active agent injection. As was indicated above, the use of excessive quantities of gas in treating a well in accordance with the invention is not harmful from the standpoint of efficacy of the treatment, so any desired quantity of gas can be introduced into the well after the surface active agent injection without detriment, but is economically unsound. Accordingly, the percentages of gas used before, during and after surface active agent injection can be varied substantially, and, in particular, if excessive quantities of gas are employed. The percentage ranges indicated are generally applicable where excessive quantities of gas are not used. In general terms, it can be stated that, prior to surface active agent injection, a sufficient quantity of gas should be injected into the producing well to force substantially all of the liquid from the subterranean channels or fingers, and that, after surface active agent injection, a sufficient quantity of gas should be used to assure that the agent is carried a substantial distance into the passages or fingers.

The optimum quantity of a surface active agent to be injected in treating a well in accordance with the invention also depends upon the nature of the well involved, for example the size of the subterranean passages or fingers. In most situations, at least about one-half gallon of the surface active agent should be employed, and more than about fifteen gallons thereof is unnecessary.

In general, any surface active agent can be used to advantage in treating a well in accordance with the invention because, as is discussed above, the hydrophilic portion thereof preferentially adheres to the wet rock, sand or the like surfaces, so that the lipophilic portion thereof makes the formations preferentially oil receptive, rather than water receptive, as would otherwise be the case, and, therefore, facilitates the flow of oil rather than the flow of water. However, optimum results can be achieved by using a surface active agent which forms a stable foam when mixed with gas and water and which reduces the surface tension of the reservoir fluids. Octylphenoxy ethanols (e.g., one commercially available from Rohm & Haas under the trade designation "Triton X–100") aliphatic alpha and beta amines, quaternary ammonium salts (e.g., those commercially available under the designation "Arquad" from Armour & Company) and organo silanes having both hydrolyzable and lipophilic aliphatic groups with the aliphatic groups preferably containing nitrogen are examples of this class of surface active agents. When such agents are employed in treating a well in accordance with the invention, the subterranean formations are not only made lipophilic, but stable foams are also formed where the surface active agents are carried into contact with the water at the extremities of the now substantially dry fingers or passages. The stable foams have exceptionally high effective viscosities, so that the return of the relatively large volumes of water through these passages or fingers is blocked; adjacent oil pockets have an opportunity to drain into the previously formed passages; and the water which was forced out of the passages, as well as other naturally occurring water or injected water tends to form new passages or fingers to the producing or withdrawal well, and is once more effective to facilitate oil production. Other known classes of surface active agents having the combination of preferred properties also cause similar phenomena.

The method of the invention is also admirably suited for the treatment of a producing well for other purposes. Frequently, during the course of operation of a well, flow is obstructed by silt-like bodies which are frequently of calcium sulfate, or by stable emulsions which form close to the lower extremity of the well casing. A chelating agent for the silt-like deposits, e.g., ethylenediaminetetraacetic acid, or emulsion breaking chemicals, e.g., the dialkyl- or the like-silicones and silicates suggested by U.S. Patent 2,585,522 can be injected into a well with a gas in order to eliminate silt deposits or stable emulsions, respectively. Since silt deposits and stable emulsions substantially reduce flow through the subterranean formations in the vicinity of a producing well, the chelating agent or emulsion breaking treatment is preferably carried out during the early portion of a gas injection in a process in accordance with the invention, as this part of the treatment is of considerable assistance in making the later portion of the treatment effective. Particularly in the use of a chelating agent it may be advantageous to use an intermittent gas injection to cause movement of liquids within the subterranean formation, and to facilitate the chemical phenomenon, and this may also be desirable in breaking a stable emulsion in some instances.

The following example is presented solely for the purpose of further illustrating and disclosing the invention, but is in no way to be construed as a limitation thereon.

*Example 1*

A withdrawal well having a reservoir rock formation 25 feet thick of 200 millidarcy permeability, 20 percent porosity and 100 pounds per square inch gauge bottom hole pressure is injected with combustion product gases, which are introduced downwardly through the well casing at a pressure of 200 pounds per square inch gauge and a rate of 110 Mc.f. per day until a total of 100,000 standard cubic feet of gases have been injected. Pumping of fluids from the tubing is continued until the casing pressure equals the bottom hole pressure. After 60,000 standard cubic feet of gases have been injected, an octylphenoxy ethanol commercially available under the trade designation "Triton X–100" is introduced as a fine mist into the combustion products being injected downwardly into the well at a rate of approximately one gallon per 15,000 standard cubic feet of gases, until a total of approx has been injected with 30,000 standard cubic feet of gases. Gas injection is continued until an additional 10,000 standard cubic feet have been injected, and the gas pressure is then bled from the casing, and pumping of the well is resumed. Pumping can be continued for six days, or until water production increases to an undesirably high proportion. The foregoing steps are then repeated.

*Example 2*

A withdrawal well having a reservoir rock formation 15 feet thick of 200 millidarcy permeability, 20% porosity and 700 pounds per square inch gauge bottom hole pressure was injected with natural gas, which was introduced downwardly through the well casing at a pressure of approximately 850 pounds per square inch gauge and a rate of 600 Mc.f. per day until a total of 600,000 standard cubic feet of gases had been injected. Pumping of fluids was continued until the casing pressure equaled the bottom hole pressure. A mixture of 10 gallons of beta-amine having the following formula:

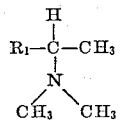

and 5 gallons of a beta-amine having

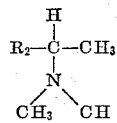

wherein $R_1$ is a normal alkyl radical of approximately 11 carbon atoms, and $R_2$ is a normal alkyl radical of approximately 9 carbon atoms, was mixed with 15 gallons of kerosene. Each of the two beta-amines used were commercial materials and were mixtures having the average chain links given above. The mixture for the first material given has a normal-alkyl chain length of 9 to 12 carbon atoms, and the second material given above was a mixture of materials having a normal alkyl chain length of 7 to 10 carbon atoms. The 15 gallons of material were mixed with 15 gallons of kerosene and the 30 gallons of mixture were introduced as a fine aerosol mist into the natural gas injected downwardly into the well. The beta-amine-kerosene mixture was mixed with the gases at a rate of .667 gallons of the amine-kerosene mixture to 10,000 standard cubic feet of gases. The gas injection was continued until 450,000 standard cubic feet were injected, an additional 150,000 standard feet of gas without the surfactant was flowed into the well, and the well was valved off for 24 hours. The oil production from this well increased by more than two fold.

The treating method of the invention can be modified somewhat when a surface active agent such as an octylphenoxy ethanol or a quaternary ammonium salt which forms a stable foam of high apparent viscosity when mixed with gas and water is used. In this case, the surface active agent can be injected with the gas as soon as the casing pressure equals the bottom hole pressure of the withdrawal well, and while there are still substantial volumes of water within the passages or fingers of the subterranean formation. The surface active agent then forms a stable foam of high apparent viscosity within the passages or fingers, and effectively blocks flow therethrough. In this case, gas and surface active agent injection should be discontinued when a substantial injection pressure increase occurs at a given rate of gas injection or when there is a substatnial decline in rate of gas injection at a given pressure. The rate of decline or pressure increase indicates that the passages or fingers have been effectively blocked by the formation of a stable foam, so that preferential flow therethrough which had caused depletion of the well, or pending depletion, is temporarily impossible. Water injection can therefore be used to force a flow of oil along different paths, or naturally occurring water will force oil ahead of it to the withdrawal well. As in the case of the previously described embodiment of the invention, the treatment is repeated when an undesirably high proportion of water appears in the effluent from the withdrawal well.

In general, the well treating method of the instant invention is applicable relative to all oil formations which reach or approach depletion because of excessive water production. In most cases, the oil will have a viscosity of at least about 2 centipoises, so that the preferential flow of water through the subterranean passages or fingers, away from the withdrawal well, which is caused by gas injection is favored by viscosity differences.

The emulsion breaking technique discussed above can sometimes be used to advantage in instances where treatment of a well with a surface active agent is not required, for example when there is no problem of depletion because of the production of an excessive proportion of water, but a stable emulsion necessitates the use of excessive pressures to obtain a reasonable flow. Such a situation is frequently encountered in the production of oil from in situ combustion secondary recovery projects. The procedure can also be used to control the directional progress of the combustion frontal zone by selectively reducing the emulsion flow restrictions among producing wells. It is usually preferred, even when using this technique, to employ a surface active agent to make the subterranean surfaces selectively lipophilic, but considerable benefit can be achieved only by breaking the emulsions, for example with one of the indicated silicones or silicates.

It will now be seen that the process of the present invention has great flexibility in that it can be used to break stable emulsions adjacent the bottom of the well which choke off oil and water flows into the well; it can force water out of water drive channels and simultaneously treat the sand to cause oil to flow back into the channels; or by changing the surface active agent, it can be used to produce a foam to plug off a particularly troublesome water channel.

It will be apparent that any type of surface active agent that is dissolved in the water will lower its surface tension and will therefore allow it to be forced from between the grains of sand. It has been found that gases are more effective than liquids in pushing back the water, because of smaller pressure drops and because they can be used to dry the sand. While all surface active agents which dissolve in water can be used to help remove the water, cationic surface active agents, particularly ammonium or phosphonium compounds of aliphatic, aryl or alkaryl compounds are particularly beneficial because the cationic ammonium or phosphonium portion of the molecule not only makes the molecule water soluble but causes it to be attracted to the surface of the sand or silaceous particles. The solubility of the aliphatic, aryl or alkyl portions of the molecule in water is a function of molecular weight, as well as other polar groups that may be attached thereto such as halogen, hydroxyls, carboxyls, sulfur, and nitrogen. In general, therefore, the degree of water solubility can be controlled by selecting one of appropriate molecular weight. These cationic surface active agents when carried by the gas into contact with water wetted sands will cause some of the cationic surface active agent to be dissolved in the water and the dissolved cationic surfactant will be attracted through the water layer to the surface of the sand. Upon reaching the surface of the sand the ammonium or phosphonium portions of the molecule attach to the sand, so that the molecules become aligned with the organic portion of the molecules together and extending away from the surface of the sand. In this grouped configuration, the surfactant becomes hydrophobic to thereby not only help drive off the remaining layer of water from the surface of the sand but to prevent its subsequent attachment to the sand. The hydrocarbon ends of the surfactants which are grouped together are lipophilic, so that oil in surrounding regions will flow by capillary action over the thus treated sand particles. The surface active agents need not be limited to cationic surface agents, and will include silicone surfactants such as the organosiloxane polymers of the type disclosed in Patent 2,834,748 of which the following in a preferred example:

$$C_2H_5\text{—}Si\text{—}\left[(O\text{—}\underset{CH_3}{\overset{CH_3}{\underset{|}{\overset{|}{Si}}}})_x\text{—}(OC_2H_4)_a\text{—}(OC_3H_6)_b\text{—}OC_4H_9\right]_3$$

wherein: $x$=6.2 average, $a$=18 and, $b$=14. The above material is particularly desirable because in its original unhydrolyzed condition, it dissolves in water and lowers its surface tension. After a period of time, however, in the presence of the water, the polyoxyalkylene groups split off of a silicon atom, so that the silicon atom becomes hydrolyzed. The polyoxyalkylene groups form an alcohol which of course is even more water soluble, and further lowers the surface tension of the water. The hydrolyzed silicon atoms are thereby made cationic and are attracted to the surface of the sand, where they will form an Si—O—Si bond with the sand, and thereafter substantially permanently make the sand lipophilic. The above material is a member of a class of materials having the following formula:

$$(R_1)_{4-n}Si\text{—}\left[(O\text{—}\underset{R_2}{\overset{R_2}{\underset{|}{\overset{|}{Si}}}})_x\text{—}(OR_3)_a\text{—}O\text{—}R_4\right]_n$$

wherein: $R_1$, $R_2$ and $R_4$ are alkyl radicals of less than 6 carbon atoms; $R_3$ is of the group consisting of alkylene and polyoxyalkylene radicals;

$n$=1, 2 or 3

$a$=an integer of at least 5 and preferably less than 60

$x$=an integer of at least 3 and less than 12

The silicone surfactants given above are quite viscous, so that they are preferably dispersed throughout the carrier gasses that are forced down the withdrawal well by first diluting the silicone surfactant in an organic solvent such as diacetone alcohol, and then injecting the diacetone alcohol solution of the silicone surfactant as an aerosol mist into the carrier gases. The above described silicone surfactants are known as fugitive silicone surfactants, because, in their original condition they are dissolvable in water, and then after a period of time, break apart to leave a portion which will waterproof a silaceous material. Still other types of fugitive surfactant-waterproofing materials exist and can be useful in the present invention.

Other types of silicone surfactants which are useful are the aliphatic, aryl, and alkaryl alkoxy silanes; and the substituted aliphatic, substituted aryl, and substituted alkaryl alkoxy silanes. These materials hydrolyze in the presence of water to provide OH groups on the silicon atom, which thereafter will migrate and attach to the surface of the sand. Such materials will include gamma aminopropyl triethoxy silane, vinyltriethoxy silane, butyltrimethoxy silane, deltaaminobutyltrimethoxy silane, and related materials well known in the art of silicone chemistry.

The following is a partial list of various types of cationic surfactants which can be used: cetyl trimethyl ammonium halides, cetyl pyridinium halides, alkyl dimethyl amine acetates, primary fatty amine acetates, dimethyl dihydrogenated tallow amines, fatty amino-propyl amines, ethanolated alkyl guanidine amine complexes, N-fatty trimethyl quaternary ammonium chlorides, stearyl dimethyl benzyl ammonium chlorides, ditallow dimethyl ammonium methyl sulfate, alkyl methylisoquinolinium chloride, cetyl dimethyl amine oxide, alky polyethoxy amide, acetic acid salts of the n-alkyl amines, di-soya dimethyl ammonium chloride, N-cetyl-ethyl morpholinium ethosulfate, N-soya-N-ethyl morpholinium ethosulfate, polyoxyethylene alkyl amine, stearamido-propyl di-methyl-B-hydroxy ethyl ammonium nitrate and/or phosphate, fatty imidazolines, dodecylbenzene chloride, lauryl pyridinium chloride, N(fatty colamino formyl methyl) pyridinium chloride, alky trimethyl quaternary ammonium chlorides, alkyl isoquinolinium bromide, and substituted imidazolines. Where the oil bearing strata contains clays, argillaceous materials, or materials containing Ca, Mg, Al or other troublesome cations, soluble fatty acid materials may be used to form insoluble soap or other surfactants on the surface of these materials.

Where the flow of water into a channel is particularly troublesome, it will be desirable to produce a foamed, plastic in situ to plug off the water. This can be accomplished utilizing the present invention by injecting a diisocyanate dissolved in an organic solvent, such as toluene, into the carrier gases. The solution can be injected as a mist into the carrier gases, preferably after all of the surface active agent has been injected into the well, and preferably after most of the carrier has been injected into the well, to drive the water back and open the channel. The combined effect of the surface active agent and the carrier gases will be to dry out the sand near the well hole. Where the surface active agent contains OH groups and/or amine groups, the diisocyanate will react to form a polymer. Where water is also present a foaming action of the resin that is produced will take place because of the liberation of $CO_2$ from the diisocyanate, and the foamed resin will bridge the particles of sand to block off the water from the gas filled channel.

A preferred schedule is to inject more than approximately 60% of the carrier gases before the diisocyanate is injected, to inject the diisocyanate into the next approximately 20% of the carrier gases introduced into the well, and therefore push the diisocyanate back into the channel with another approximately 20% of the carrier gases. The precise percentages, however, will need to be varied to suit each individual application.

It will be apparent that various changes and modifications can be made from the specific details set forth herein without departing from the spirit and scope of the invention as defined in the appended claims.

I claim:

1. A method for increasing the flow of oil from a subterranean bed of oil bearing sand utilizing a flow of water from a water source through the subterranean bed to a withdrawal well having a casing of given volume, said method comprising: causing water to flow through said subterranean bed toward said withdrawal well while pumping said withdrawal well until such time as a water channel develops in said withdrawal well, injecting a gaseous carrier fluid into said water channel from said withdrawal well in an amount which provides a volume of gas in said water channel generally greater than the casing volume of said withdrawal well to force water out of said channel toward said water source, causing a surface active agent to be dispersed throughout said gaseous carrier fluid fed to said channel for distribution throughout said channel, causing said withdrawal well to rest to allow oil flow into the channel, and initiating a water drive from said water source while pumping said withdrawal well.

2. The method of claim 1 wherein the water source for the flow of water through the subterranean bed is a drive well, the water channel to said withdrawal well is developed by a water drive from said drive well, and a water drive is again initiated from said drive well after the surface active agent has been injected into said channel from said withdrawal well by said gaseous carrier fluid.

3. The method of claim 2 wherein said drive well is pumped while said gaseous carrier fluid is injected into said channel from said withdrawal well.

4. The method of claim 2 wherein both said drive well and said withdrawal well are pumped while said gaseous carrier fluid is injected into said channel from said withdrawal well.

5. The method of claim 1 wherein said surface active agent is dispersed throughout said gaseous carrier fluid as an aerosol.

6. The method of claim 5 wherein said surface active agent is diluted with an organic solvent to form a mixture, and the mixture is dispersed throughout said gaseous carrier fluid as an aerosol.

7. The method of claim 1 wherein said surface active agent is a fugitive surfactant that is water soluble as carried by said gaseous carrier fluid and which when in contact with water for an appreciable period of time breaks down to a molecule having an end attracted to siliceous material and an end which is hydrophobic and which thereby coats the surface of the siliceous material to form a water repellant coating.

8. The method of claim 7 wherein the fugitive surfactant has a structure corresponding generally to:

$$(R_1)_{4-n}Si\left[\left(O-\underset{R_2}{\overset{R_2}{\underset{|}{\overset{|}{Si}}}}\right)_x-(OR_3)_aO-R_4\right]_n$$

wherein $R_1$, $R_2$ and $R_4$ are lower alkyl radicals of less than 6 carbon atoms; $R_3$ is of the group consisting of alkylene and polyoxyalkylene radicals; $n$=1, 2 or 3; $a$=an integer between 5 and 20; $x$ is an integer of at least 3 and less than 12.

9. The method of claim 1 wherein said surface active agent is a cationic surface active agent dispersed through said gaseous carrier as an aerosol.

10. The method of claim 1 wherein an emulsion breaking chemical is injected into said gaseous carrier fluid.

11. The method of claim 1 wherein a chelating agent for suspending silt is injected into the gaseous carrier fluid.

12. The method of claim 1 wherein a sizable initial fraction of the gaseous carrier fluid is injected into the withdrawal well substantially devoid of the surface active agent and the major portion of the surface active agent is injected into a portion of the gaseous carrier fluid and introduced to the well after said initial fraction has displaced water out of said channel.

13. The method of claim 12 wherein said portion of said gaseous carrier fluid having said surface active agent dispersed therein is followed by a final portion of said gaseous carrier fluid that is substantially devoid of the surface active agent.

14. The method of claim 1 wherein a surface active agent forming a stable foam is injected into said carrier fluid after a major portion of said carrier fluid has been forced into the water channel.

15. A method as claimed in claim 1 wherein the withdrawal well is pumped during the time that gas is injected into the casing until the bottom hole pressure of the withdrawal well equals the pressure in the withdrawal well casing.

16. The method of claim 1 wherein a surface active agent reactive with diisocyanate is first injected into the withdrawal well along with a major portion of said carrier gases, the diisocyanate is next injected into the well using a portion of the remaining carrier gases, and a final portion of the carrier gases devoid of diisocyanate is injected into the withdrawal well to force the diisocyanate back into the channel.

References Cited

UNITED STATES PATENTS

| | | | |
|---|---|---|---|
| 2,469,354 | 5/1949 | Bond | 166—9 X |
| 2,788,855 | 4/1957 | Peterson | 166—42 |
| 2,812,817 | 11/1957 | Sayre | 166—9 |
| 2,865,453 | 12/1958 | Widmyer | 166—42 |
| 2,866,507 | 12/1958 | Bond et al. | 166—9 |
| 3,093,192 | 6/1963 | Allen | 166—42 X |
| 3,252,512 | 5/1966 | Baker et al. | 166—2 |
| 3,283,818 | 11/1966 | Santourian | 166—42 |
| 3,289,764 | 12/1966 | Santourian | 166—45 X |

STEPHEN J. NOVOSAD, *Primary Examiner.*